July 4, 1933.  R. A. NORLING  1,917,054
ROTARY MOTOR
Filed Nov. 11, 1929  5 Sheets-Sheet 1

July 4, 1933. R. A. NORLING 1,917,054
ROTARY MOTOR
Filed Nov. 11, 1929 5 Sheets-Sheet 2

Inventor:
Reinhold A. Norling
By Eugene Ewand Atty.

July 4, 1933. R. A. NORLING 1,917,054
ROTARY MOTOR
Filed Nov. 11, 1929 5 Sheets-Sheet 4

Inventor:
Reinhold A. Norling
By Eugene Cowan
Atty.

July 4, 1933.   R. A. NORLING   1,917,054
ROTARY MOTOR
Filed Nov. 11, 1929   5 Sheets-Sheet 5

Inventor:
Reinhold A. Norling

Patented July 4, 1933

1,917,054

UNITED STATES PATENT OFFICE

REINHOLD A. NORLING, OF AURORA, ILLINOIS, ASSIGNOR TO INDEPENDENT PNEUMATIC TOOL COMPANY, OF CHICAGO, ILLINOIS, A CORPORATION OF DELAWARE

ROTARY MOTOR

Application filed November 11, 1929. Serial No. 406,271.

This invention relates to improvements in fluid operated rotary motors, and more particularly to rotary motors adapted for use in portable tools such as drills, grinders, nut and screw setters and the like.

Rotary motors of the type to which my invention pertains comprise a rotor chamber and a cylindric rotor eccentrically mounted in said chamber with the rotor at one point in its circumference in contact with the inner surface of the chamber. The general practice heretofore has been to make the inner surface of this chamber on a single radius with the center of the chamber sufficiently offset from the center of the rotor to dispose the two in eccentric relation. The rotor is provided with a plurality of slots or grooves which extend longitudinally thereof and piston elements in the form of blades are slidably mounted in the slots. The blades are forced out against the inner surface of the rotor chamber by means of the motive fluid employed to operate the tool and suitable ports are provided to feed the motive fluid against the rear sides of the blades to rotate the rotor and thus operate the motor. With the rotor chamber formed on a single radius, the space between the inner surface of such chamber and the outer peripheral surface of the rotor gradually increases to the widest point which is diametrically opposite the point where the rotor contacts with the inner surface of the chamber. In other words, this space decreases in area on opposite sides of the widest point with the result that the force of the motive fluid on the blades is unequal during the entire revolution of the rotor. Manifestly, the torque of the rotor varies in proportion to the change of area of the space referred to and a steady and evenly operated tool cannot be obtained.

In accordance with my invention, I overcome the difficulty noted by making the rotor chamber in such a manner that the radius of that portion of the chamber opposite the point of contact with the rotor has a substantially uniform area from a point where the blades enter the space after leaving the cutoff of the intake port to a point where the blades leave the space at the exhaust port thereby obtaining a uniform torque on the rotor throughout the entire revolution of the same and providing a steady and evenly running tool.

One manner in which this object of my invention may be accomplished is by making the rotor chamber on four radii. The radius for the portion of the chamber with which the rotor contacts is equal to the radius of the rotor and has the same center as the rotor. The portion of the chamber having an equal area throughout its circumferential length has a radius longer than that of the rotor but having the same center. The two opposite portions of the rotor chamber which are at the intake and exhaust respectively are each made on a radius longer than that of the rotor and on centers which are offset from the center of the rotor. The several curved portions of the chamber merge where they meet and provide an inner surface for the blades which is a continuous curve.

Another object of my invention is to make the rotor and its shaft in one integral piece so that the slots for the blades may be made as deep as possible and thus permit the use of the relatively wide blades so that a considerable portion of each blade will remain in its slot and thus properly support the blade and prevent it from tilting to wear out the slots under the force of the motive fluid against one side of the blade.

Another object of my invention is to curve the bottoms of the slots and the lower edges of the blades so that the blades will increase in width toward the center and thus have the blades of a less width at their ends so that the lap required at the ends of the rotor may be provided to prevent leakage from the inlet ports which feed the slots at the lower ends of the blades.

Another object of my invention is to provide a simple and inexpensive form of governor mechanism whereby the supply of motive fluid to the rotor will be automatically controlled in accordance with the speed of the rotor.

A further object of my invention is to provide a governor in which centrifugal actuated balls are employed and which cooperate with inclines to control the inward and outward movement of one of the members of the governor device to move the valve which controls the inlet of motive fluid to the rotor.

A further object of my invention is to simplify the construction of this valve by making it in the form of a cylindric member and thus permit the valve to be readily and easily made and obtain a proper sliding fit in its housing.

The invention consists further in the matters hereinafter described and claimed.

The tool shown in the drawings has a supporting frame 1, which carries a gear case section 2 on its under side and feed screw and motor sections 3, 4, respectively, on its upper side. The motor section 4 is made as a complete unit separate and distinct from the other sections and is detachably secured to the frame 1 so that the entire motor section can be readily and easily removed from the tool whenever desired, as for inspection or repair, without disturbing or disconnecting the other sections from the frame. This is an important feature of my invention in that it facilitates the manufacture and assembly of the motor section and its application to and removal from the frame as a complete unit.

Figure 1:
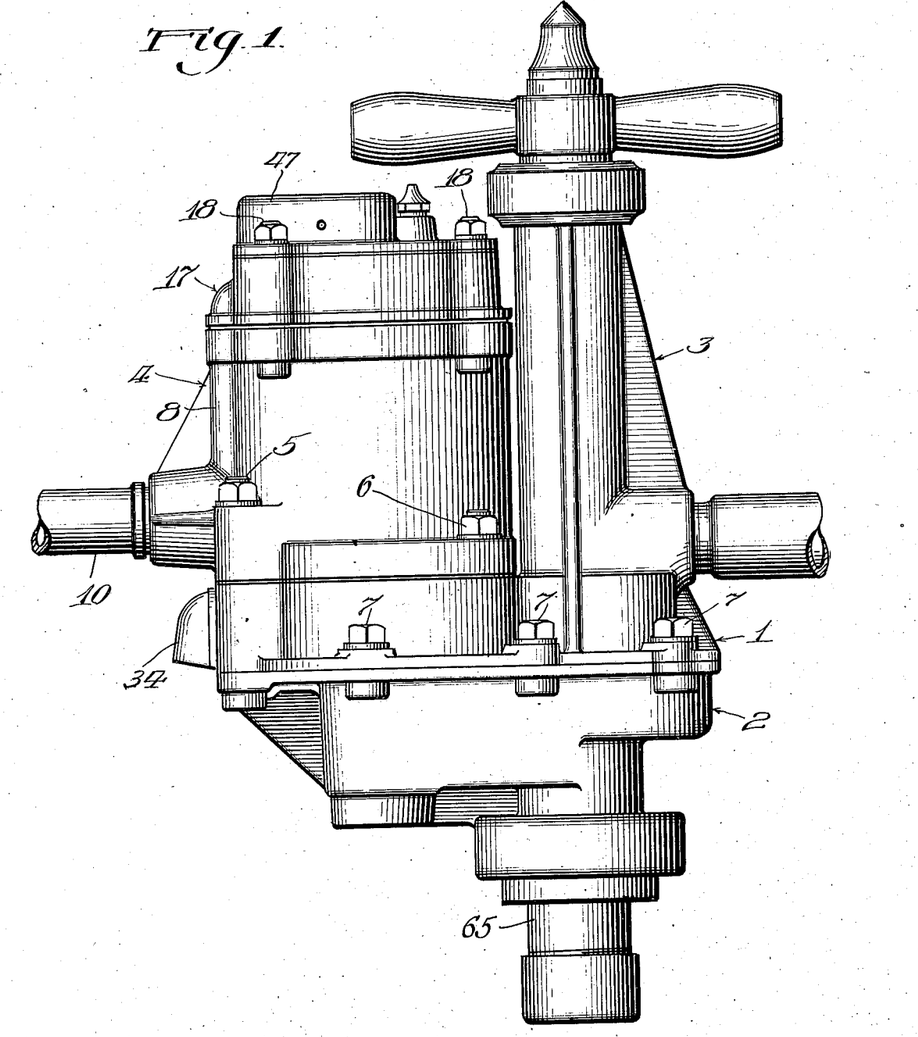
Fig. 1 is a side view of a portable pneumatic rotary tool constructed in accordance with my invention.
Figure 8:
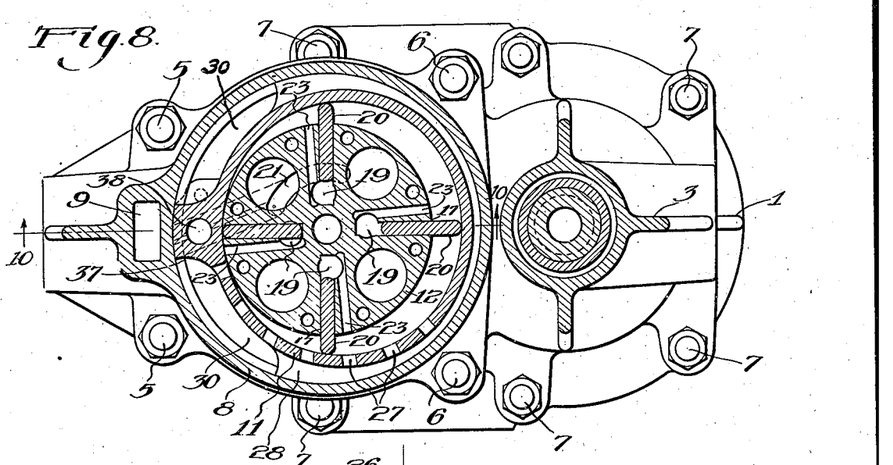
Fig. 8 is a horizontal sectional view taken on the line 8—8 of Fig. 2.

The motor section 4 may be removably secured to the frame 1 in any desired manner. In Figs. 1 and 8, I show the section 4 secured to the frame 1 by a number of fastening elements 5, 6 arranged on the outside of the section at a number of points about the same. The elements 5 are in the form of bolts which pass through the frame 1 and the gear case section 2 and thus secure both to the frame. The elements 6 are in the form of studs carried by the frame 1 and are threaded to receive clamp nuts as shown in Fig. 1. Additional fasteners 7, 7 in the form of bolts are employed to secure the gear case section 2 to the frame 1 as shown in Figs. 1 and 8.

The motor section 4 has an outer casing 8 provided on one side with an inlet passage 9 (Fig. 2) to which is connected a hollow handle 10 through which the motive fluid (compressed air) required to operate the tool is supplied. A manually operated revolvable throttle valve mechanism 10a (Fig. 3) is applied to or incorporated in the handle 10 at its outer end to control the supply of the motive fluid to the tool.

Figures 2, 3:
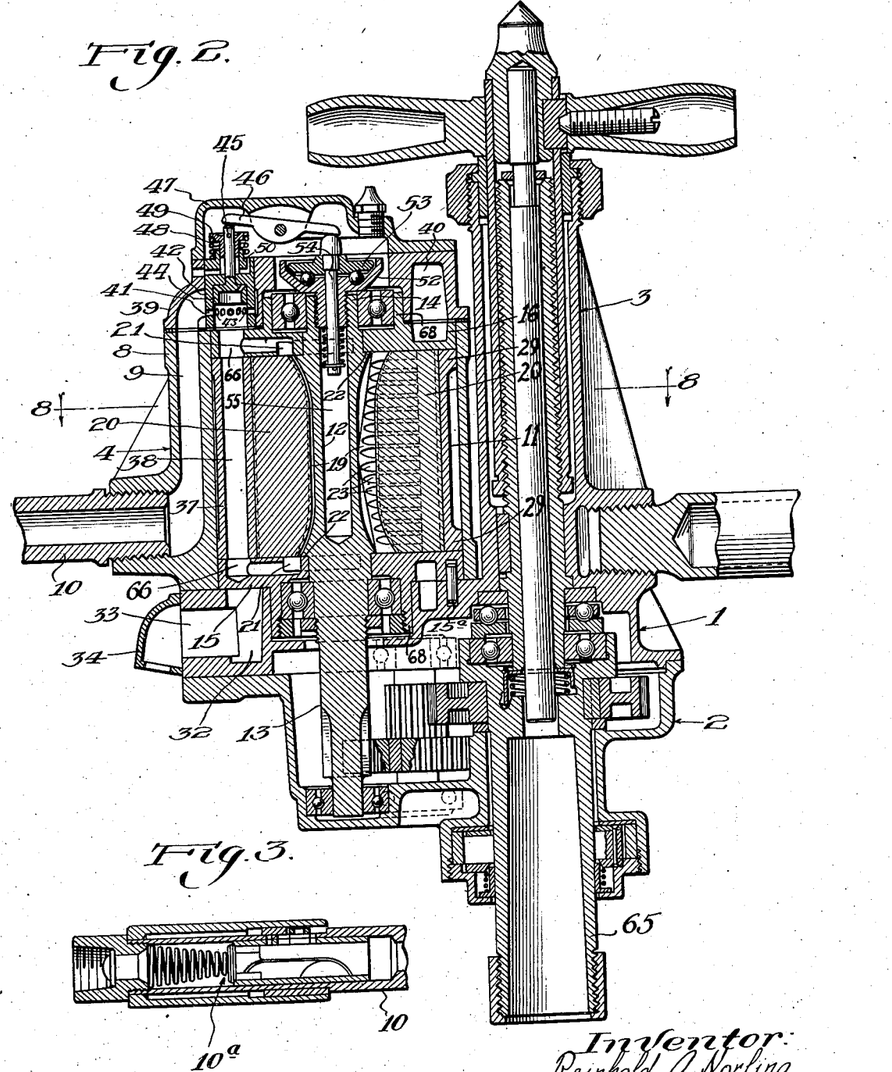
Fig. 2 is a longitudinal vertical sectional view of the tool.
Fig. 3 is a similar view through one of the handles of the tool to show the throttle mechanism.

Located within the casing 8 is a rotor housing or shell 11 in which is a revolvable rotor 12 having shaft extensions 13, 14 at its opposite ends. These extensions extend through end plates 15, 16 at and closing the opposite ends of the casing 8 and shell 11. The rotor housing or shell 11 is clamped between the end plates 15, 16 and is thus held from rotation when said plates are clamped in place. The lower plate 15 is clamped between the lower end of the housing 11 and the frame 1 when the outer casing 8 is clamped to the frame by the fastening elements 5, 6, said casing having bosses and flanges through which said elements extend, as shown in Figs. 1 and 8. The upper plate 16 is clamped between the upper end of the housing 11 and the governor enclosing cap assembly 17 when the latter is clamped on the upper end of the casing 8 by bolts 18. The plates 15, 16 are held from rotation by being doweled or otherwise secured to the adjacent member of the cap assembly 17 and the frame 1, respectively, as shown in Fig. 1. A dowel 15a is shown in Figure 2 for the plate 15. For the dowels, the plates have holes or apertures 15b, 16a, as shown in Figs. 11 and 12.

The rotor 12 is provided with a plurality of longitudinally extending radial slots 19, 19 in which fit and slide piston elements in the form of flat blades 20, one in each slot. The rotor 12 and its shaft extensions 13, 14 are made in one piece so that no shaft element extends through the rotor, thereby permitting the slots 19, 19 to be brought relatively close to the axis of the rotor and thus be deeper than should a shaft element be used. By this arrangement, the blades may be given considerable width and have sufficient bearing against the sides of the slots even when the blades extend outward from the slots to their fullest extent. This will support the blades and prevent them from being tilted in the slots under the force of the motive fluid on one side of the blades in the rotation of the rotor. To secure the greatest depth for the blades and yet allow for sufficient lap at the ends of the rotor so as to prevent leakage from the the inlet ports to be presently referred to, I curve the bottoms of the slots and the inner edges of the blades so that the blades will be widest at their central or mid portions. Thus the ends of the blades are not as wide as their mid portions and the inlet ports 21, 21 in the end plates 15, 16 may be located sufficiently outward from the axis of the rotor to provide annular shoulders 22, 22 at the ends thereof, which shoulders are overlapped by the center portions of the plates to prevent leakage from the ports 21 to the gear case and governor ends of the tool about the shaft extensions 13, 14.

Figure 9:
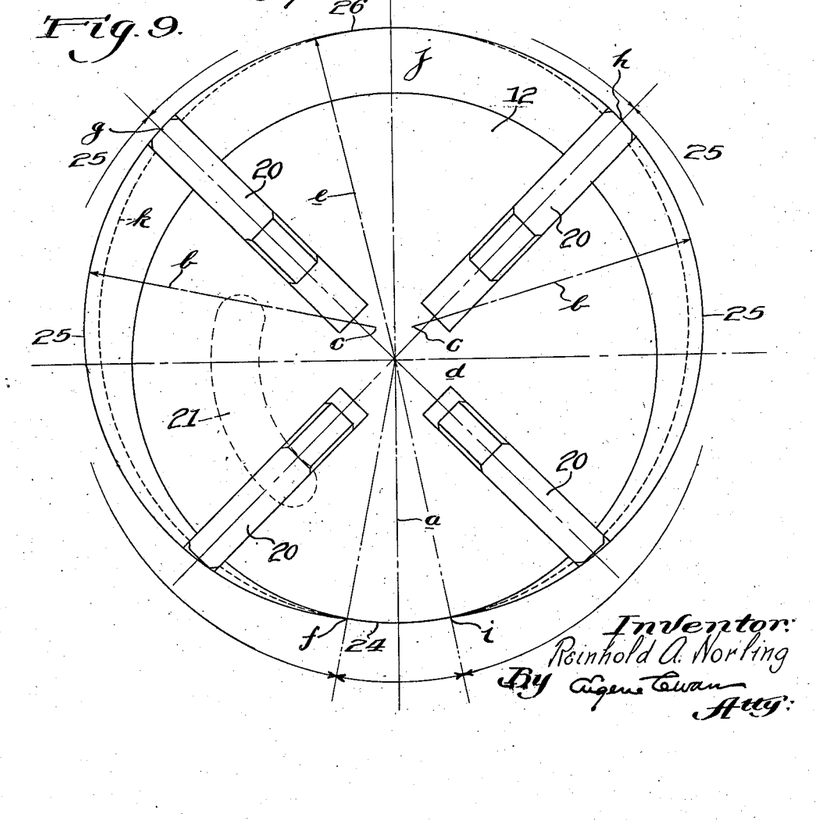
Fig. 9 is a diagrammatic view illustrating the curvature of the inner surface of the rotor chamber.
Figure 10:
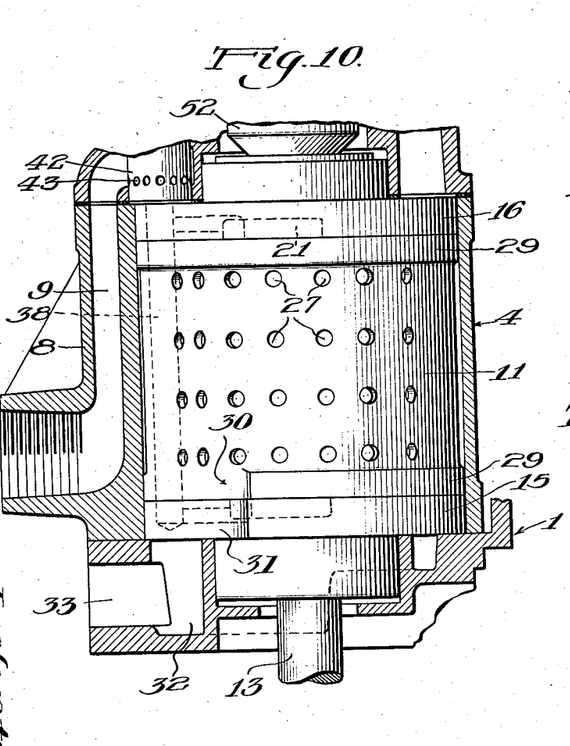
Fig. 10 is a sectional view taken on line 10—10 of Fig. 8.
Figure 11:
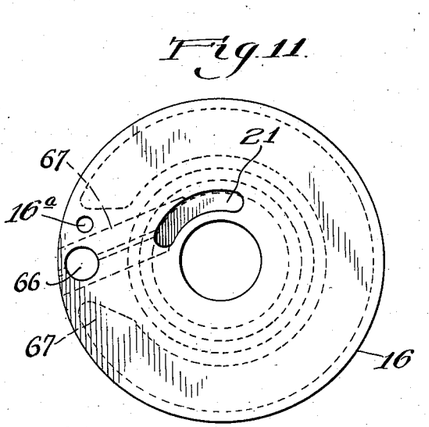
Figs. 11 and 12 are face views of the end plates which are used at the opposite ends of the rotor chamber.
Figure 12:
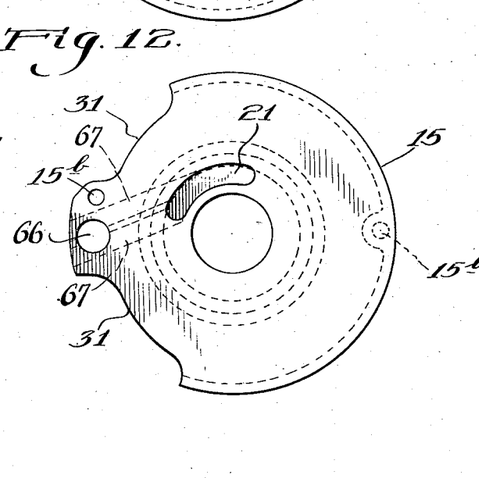

The inlet ports 21, 21 are preferably arcuate in form, as shown in Figs. 9, 11 and 12, so as to feed motive fluid to the bottoms of the slots 19 for approximately a quarter of the revolution of the rotor. The motive fluid is supplied to the rear sides of the blades 20 from the bottoms of the slots 19 by providing a multiplicity of passages 23, 23 in the rotor directly behind each blade. These passages are connected at their inner ends with the bottoms of the slots and are distributed along the length of the rotor where they open through the periphery thereof so as to supply motive fluid along the entire length of each blade and thus subject the entire outwardly extending portion of the blade to the force of the motive fluid.

The inner surface of the housing 11 against which the outer longitudinal edges of the blades bear is made up of four joined arcuate sections having different radii, as shown in Fig. 9. The section 24 is concentric to the rotor 12 having the same radius $a$ and thus is in full contact with the rotor throughout the full circumferential length of the section as shown in Fig. 9. The sections 25, 25 on opposite sides of the section 24 have radii $b$, $b$, of the same length but longer than the radius $a$ with their centers $c$, $c$, offset to the same extent on opposite sides of the axis $d$ of the rotor and above the same. The section 26 is between and joins the sections 25, 25 and has a radius longer than either radius $a$ or $b$, but with its center at the axis $d$ of the rotor. With the inner surface of the housing 11 so made, the several sections 24 to 26 comprise arcs of the circles which, where they meet at $f$, $g$, $h$ and $i$, merge for a portion of their length and form a substantially continuous curve about the rotor. The space between the periphery of the rotor 12 and the inner surface of the housing 11 widens gradually on opposite sides from the section 24 to the junction of sections 25 with section 26. The latter being spaced radially outward from the rotor and being concentric thereto, provides a space $j$ which has the same cross-sectional area throughout its entire circumferential length. The result is that the blades 20 as they pass through space $j$ do not move radially inward or outward and thus present a uniform area to the motive force which would not be the case should the inner surface of the housing be laid out on a circle of a single radius as indicated by the dotted line $k$ in Fig. 9. With a substantially uniform blade area exposed as the blades pass through the space $j$, a difference in pressure may be maintained on opposite sides of the blades to rotate the rotor. The pressure on the front side of the blade is always less than that on the rear side even when the space $j$ is cut-off from the inlet and exhaust sides of the rotor chamber by the blades being at the opposite ends of said space, as at $g$ and $h$ respectively, as shown in Fig. 9. While the pressure in the space $j$ may be reduced due to expansion, the pressure on the front side of the blade at $h$ is less than on the rear side because the front side of the blade is open to the exhaust through exhaust ports in the chamber portion between $h$ and $i$. The blade at $g$ has a greater pressure on its rear side than on its front side because the rear side has just cut-off from the inlet ports 21 of the rotor chamber. This pressure is greater than the reduced pressure in space $j$ and the blade is moved past point $g$, resulting of course in opening the front side of the blade to the exhaust as the blade at $h$ passes the same. This is early in the movement of the blade beyond point $g$, and the blade is subject to the main load throughout its travel in space $j$. As the blade area exposed in this space is substantially constant and larger than the blade area exposed throughout the inlet space, it is the blade traveling through space $j$ that does the work. This gives a practically uniform torque to the rotor and produces an even and steady running tool.

The inlet and exhaust portions of the rotor chamber gradually taper to the seal provided at the contact of the rotor with the chamber at section 24. This is brought about by having the sections 25, 25, each on a single radius and more than 90 degrees in length. The shorter the seal, the longer the taper. Thus the section 24 which makes the seal is made considerably less than 90 degrees in length. The advantage of the gradual taper is that it minimizes the drag on the blades as they travel to the seal on the exhaust side of the chamber. This contributes to the production of maximum torque and power by the rotor due to decrease in friction as to the blades travel "up" the gradual incline to the seal. Centrifugal force and such pressure fluid unable to escape from beneath the blades, especially at high speeds, forces the blades against the chamber surface. With the latter gradually inclined on its exhaust side, where the blades are not under power, the friction is considerably reduced which is to the advantage of the rotor in torque, speed and power. The incline on the inlet side of the chamber permits an early inlet of pressure behind the blades as they pass the seal. The section 25 on the inlet side of the chamber increases as it leaves the seal, and thus enables a larger volume of air to be supplied for expansion back of the blades after the cut-off takes place. This happens as soon as the blades pass the cut-off ends of inlet ports 21, 21 and from there on the air behind the blades is permitted to expand to give maximum power with the minimum amount of air required instead of exhausting at full pressure.

The housing or shell 11 is provided with a plurality of exhaust ports 27, 27 in the section 25 on the side of the rotor opposite the inlet ports 21. The ports 27 preferably start at the junction of section 25 with section 26 so that the air behind the blades will be exhausted from the rotor chamber as soon as the blades pass said junction. As the air has expanded during the passage of the blades through the chamber *j* defined by the section 26, such air will be exhausted from the tool at a pressure lower than that at which it is admitted. The air beneath the blades by passages 23 also exhausts through the exhaust ports 27 and thus the blades are permitted to move radially without hindrance back into the slots as the distance between the rotor and the housing decreases as the blades approach the point of contact between the rotor and the housing.

With the section 24 on the same radius as that of the rotor, said section forms an arc of the same circle as the rotor and thus provides an increased area of contact between the rotor and the housing 11 so as to prevent leakage of live air from the inlet to the exhaust side of the housing.

With a single chamber 11 for the rotor, the speed of the rotor is not retarded nor any undue wear placed on the blades and the slots because the blades are required to move into and out of the slots only once in each complete revolution of the rotor. Moreover, with a single rotor chamber, the blades are subjected to the pressure of the motive fluid throughout more than half of the circumference of the rotor, thereby getting a steady pull on the rotor and also less drag on the blades to retard or reduce the speed.

The housing 11 is arranged in the casing 8 in radial spaced relation thereto to provide an exhaust chamber 28 about the outer side of the housing and into which chamber the exhaust ports 27 open, as shown in Fig. 8. With this arrangement, the exhaust air is allowed to expand and therefore may be discharged from the tool with less force and without objectionable noise.

The housing 11 is provided at its ends with exterior ribs or flanges 29, 29 which serve to space the intervening portion of the housing from the casing 8 to provide the exhaust chamber 28 referred to. The flange 29 at the lower end of the housing is cut away or milled out for a part of its circumference to provide an outlet passage 30 for the exhaust from said chamber. The adjacent end plate 15 is also cut away or milled out as at 31, 31 (Fig. 12) to provide a passage for the exhaust and these passages register and open into an annular exhaust chamber 32 in the portion of the frame 1 below the plate. The chamber 32 opens into an exhaust passage 33 in said frame and this passage connects with the atmosphere and has an exhaust deflector 34 therefor, as shown in Fig. 2. The deflector 34 is formed to direct the exhaust toward the work. If this is objectionable, a deflector 35 of the form shown in Figs. 5 and 6 may be employed. As illustrated, the deflector 35 is in saw tooth form and has a number of outlet ports or openings 36, 36 which will deflect the air laterally from the tool.

The housing 11 is provided at one side with a longitudinally extending lug 37 in which is an air supply passage 38, the lug 37 being arranged on the same side of the tool as the supply passage 9 and connected therewith through a control valve which is mounted in the governor case assembly 17 at the upper end of the motor section 4.

Figure 4:
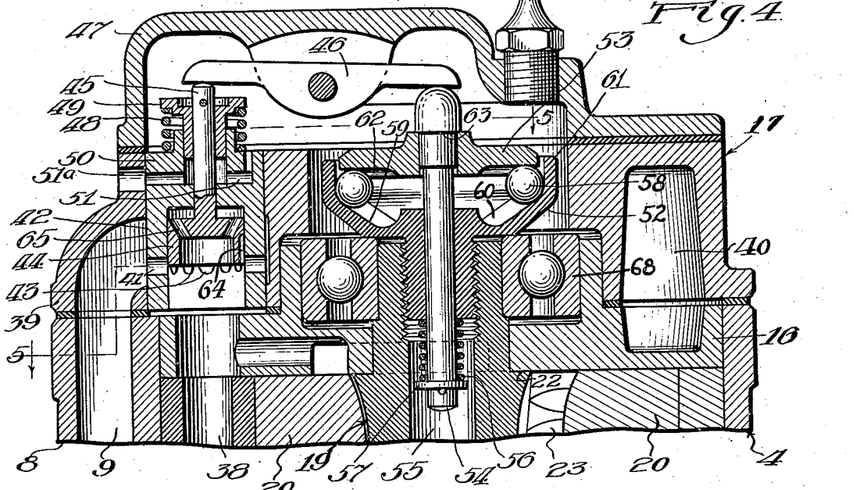
Fig. 4 is a similar view taken through the upper end of the motor section of the tool to show the air control valve and the governor device for automatically operating the same.

The case 17 has a body member 39 in which is an annular passage 40 which, by a short passage 41 connects with inlet passage 9, as shown in Fig. 2. A bushing 42 is fitted in passage 40 directly above passage 38 and opens at its lower end into the same, said bushing having a series of radial ports 43 about the same and extending transversely therethrough to connect passage 38 with passage 9 when the ports are open. A plug valve 44 is slidably mounted within the bushing to open and close the ports 43 and thus control the supply of motive fluid to the rotor chamber 11. Said valve has a stem 45 which extends through and above the closed upper end of the bushing. The upper end of the stem is directly beneath one end of a lever 46 which is pivoted between its ends in a cap 47 which closes the upper side of the member 39, as shown in Fig. 4. A coiled expansion spring 48 surrounds the upper end of the stem 45 between the top of the bushing 42 and the under side of a collar 49 held on the stem by a pin, as shown. The spring bears against the parts and serves to normally move the valve upward and hold the stem against the under side of the lever 46. The collar 49 has a tubular portion having a sliding fit in the bore in the top part 50 of the bushing to hold the valve central and guide it in its opening and closing movement. The top part 50 of the bushing has a passage 51 which connects the interior of the cap 47 with the atmosphere through an opening 51a in the member 39. The passage 51 also intersects the bore in the member 50 through which the stem extends and thus allows any air leaking past the stem from the valve 44 to find outlet to the atmosphere and prevent building up a pressure in the cap 47 to hinder free movement of the parts therein.

To automatically control the opening and closing movement of the valve 44 so as to regulate the speed of the rotor, I provide a governor device which is carried by the rotor and rotates therewith. Said device, as shown in Figs. 2 and 4, comprises a pair of annular members 52, 53 arranged one above the other in axial alinement and with the member 52 fixed to the shaft extension 14 of the rotor, as by a screw connection as shown. The member 53 is mounted on a rod 54 which extends through the centers of the member 52, 53 and at its lower or inner end extends into a bore or recess 55 at the axis of the rotor 12. A coiled expansion spring 56 surrounds the inner portion of the rod 54 and bears at one end against the hub portion of the member 52 and the other end against a collar 57 pinned on the rod. The spring acts normally to move member 53 toward member 52. A plurality of balls 58, 58 are disposed between members 52, 53 and cooperate with inclines 59 in the member 52 to control the movement of the member 53 toward and from the member 52 as the speed of the rotor varies. The inclines 59 form the bottoms of radial grooves 60 formed in the member 52 to retain the balls in place, there being a groove for each ball. The balls 58 are moved toward the outer ends of the grooves 60 by the centrifugal force set up in the rotation of the rotor 12 when such force is sufficient to overcome the tension of the spring 56 which is relatively weak. As the balls are thus moved they ride outward on the inclines 59 and move member 53 away from member 52. This moves the outer end of the rod 54 against the end of the lever 46 opposite the end engaging the stem of the valve 44 and rocks the lever to move the valve toward its closed portion. As the speed of the rotor decreases, centrifugal force lessens and the spring 56 draws member 53 toward member 52 returning the balls to the inner ends of the grooves, permitting spring 48 to open the valve and hold lever 46 against the rod 54. The outer marginal portion 61 of member 52 extends outward to provide a stop at the outer ends of the grooves 60 to limit the outward movement of the balls. Member 53 provides a cover for the balls and prevents them from working or falling out of place. Member 52 is also provided in its inner surface with shallow radial grooves 62, 62, one for each ball 58 to provide a guide therefor. The outer end of the rod 54 is enlarged to provide a shoulder 63 against which member 53 bears and thus causes the member to move the rod with it when the member is moved outward by the balls.

Figure 5:
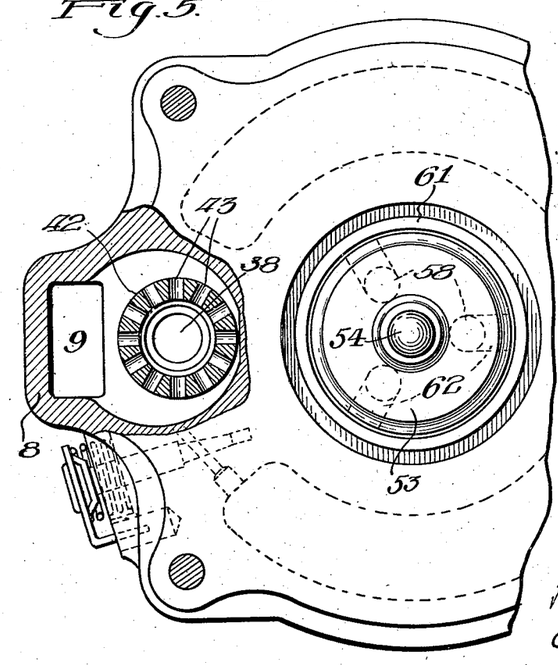
Fig. 5 is a horizontal sectional view of such part of the tool taken on the indirect line 5—5 of Fig. 4.
Figure 6:
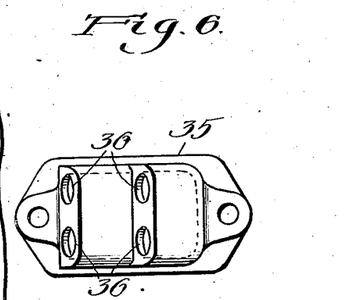
Fig. 6 is a top plan view of an exhaust deflector to be hereinafter described.
Figure 7:
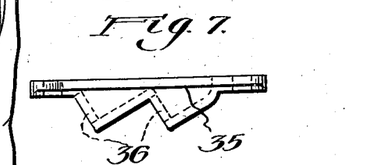
Fig. 7 is a side view of the same.

Ports 43 in the bushing 42 extend radially through the bushing and are disposed in the same general plane, as shown in Fig. 5. This arrangement permits the valve member 44 to open and close all of the ports simultaneously. The skirt of the valve when in closed position completely closes all of the ports. Said skirt is provided on its outer side with a short longitudinal groove 64 which permits a restricted feed of live air to the passage 38 from the inlet passage 9 when the valve member is in fully closed position, as indicated in dotted lines in Fig. 4. By this arrangement, a sufficient amount of live air flows to the tool to keep its rotor in rotation even when the valve 44 has been completely closed by the action of the governor device. Thus the tool may be kept running at the speed at which the governor closes the valve, and be under power for immediate use as the tool is moved from one piece of work to another. The valve member 44 has ports 65, 65 in its upper end to feed live air back of the valve and thus balance its action.

When the tool is not in operation the valve 44 and governor device are in the positions shown in Fig. 2. The balls 58 are in their innermost positions, that is, nearest the axis of the rotor, and the valve member 44, which is open, completely uncovers the ports 43 so that a full volume of air may be supplied to the rotor on the opening of the throttle valve 10a in the handle 10. The slots 19 in the rotor 12 extend the full length of the same and open through the end of the rotor opposite the plates 15, 16. The blades 20 extend the full length of the slots and bear against the inner sides of the plates. The inner edges of the blades are beveled, as shown in Fig. 8, so that live air may get beneath the blades to force them out against the inner surface of the housing 11 even when the blades extend to the full depth of the slots as when the blades pass the point of contact between the rotor 12 and the housing 11.

The passage 38 in the lug 37 connects the inlet ports 21, 21 so that both ports may be fed with motive fluid from one end of the tool. The end plates 15, 16 have openings 66 therein in register with the passage 38 and said openings connected to the ports 21 through passages 67, 67 formed in the plates as shown in Figs. 2, 11 and 12. By this port and passage arrangement pressure fluid is supplied simultaneously to the opposite ends of the rotor slots 19 as the slots pass the inlet ports 21. Thus the blades are subjected to substantially equal pressure from below at their opposite ends and are moved bodily outward of their slots without endwise tilting or canting. Moreover, the pressure fluid has an opportunity to enter and fill the slots twice as fast, and thus quickly subject the blades to pressure throughout their entire length. The bearings for the shaft extensions 13, 14 are on the outer sides of the plates 15, 16 and are carried thereby in annular flanges 68, 68. The bearing at the upper end of the rotor is a floating bearing while the bearing at the lower end of the rotor holds the rotor from endwise movement and thus prevents the ends of the rotor from rubbing against the plates 15, 16. This is accomplished by having the inner ring of the lower bearing clamped on the shaft extension 13 of the rotor and the outer ring clamped in the support for the bearing on the end plate 15, as shown in Fig. 2. The shaft extension 13, as shown in Fig. 2, extends into the gear case 2 and is provided with teeth which mesh with one of the gears of the gear train in said case through which the spindle 69 of the tool is rotated by the rotor 12.

The rotary motor structure shown and described is particularly applicable for portable tools of the hand type because the motor is light in weight and compact and small in arrangement and design. Tools equipped with my motors can be run at speeds as high if not higher than those developed with high frequency electric drills and may be used in place of such tools with the advantage of not having any electric connections of parts to short-circuit or burn out. Moreover, my motors are simpler and easier to manufacture, inspect and repair than electric motors, and the tools can be operated on an air equipment which is simpler and less expensive than the electrical equipment required for high frequency systems.

The details of structure shown and described may be variously changed and modified without departing from the spirit and scope of my invention.

I claim as my invention:

1. In a fluid actuated rotary motor, inner and outer casings spaced apart to provide an exhaust chamber between them, a rotor within the inner casing, piston elements carried by said rotor and engageable with the inner surface of the inner casing, plates closing the ends of the inner casing, inlet ports in said plates for supplying motive fluid to the rear sides of the blades on one side of the rotor, said inner casing having exhaust ports on the opposite side of the rotor and opening into the exhaust chamber between the casings, said inner casing having an exterior radial lug on one side, and a passageway in said lug for connecting the inlet parts of the plates together across the exhaust chamber.

2. In a fluid actuated rotary motor, a rotor chamber, a rotor assembly therein, a valve for controlling the supply of motive fluid to said chamber, and a governor device offset to one side of the valve and rotated by said rotor and having inner an outer annular members, the inner member being fixed to the rotor and the outer member being movable axially thereof, centrifugal balls between said members, said inner member having inclines for the balls for moving the outer member outward from the inner member as the balls travel outward along said inclines, a lever pivoted between its ends and extending between the valve and the governor for transmitting the outward movement of said outer member to said valve to close the same, and means for returning the valve to open position as the balls move inward along said inclines, said valve and said outer member both having stems engaging the opposite ends of said lever.

3. In a fluid actuated rotary motor, a rotor casing, a rotor assembly therein, a valve for controlling the flow of motive fluid to said casing, and a governor device offset to one side of the valve and rotated by the rotor and having inner and outer annular members, one fixed to the rotor and the other movable axially thereof, centrifugal balls between said members, the fixed member having inclines for the balls for moving the movable member outward from the fixed one as the balls travel outward along said inclines, a lever pivoted between its ends and extending from the valve to the governor device, stems engaging the opposite ends of the lever and respectively carried by said valve and movable member, and springs acting on said stems to open the valve in the inward movement of said member and to keep the same engaged with said balls.

4. In a fluid actuated rotary motor, a rotor chamber, a rotor assembly therein, means whereby a motive fluid may be supplied to said chamber for rotating the rotor, means providing an exhaust passage for said chamber, and an exhaust deflector at the discharge end of said passage, said deflector being saw-tooth in form and having discharge openings in certain of the inclined portions thereof.

5. In a fluid actuated rotary motor, a rotor chamber, a rotor assembly therein, a valve for controlling the supply of motive fluid to said chamber and offset to one side of the axis of the rotor, a governor device in line with and rotated by said rotor, said governor having a member movable toward and from the rotor, and freely movable elements associated with said member and acting under the influence of centrifugal force set up in the rotation of the rotor to impart outward movement to said member, a lever pivoted between its ends and extending between and engaging the valve and the governor for transmitting the outward movement of the member to the valve to close the same, and means for returning the valve to open position in the inward movement of the member as the speed of the rotor decreases.

6. In a fluid actuated rotary tool, the combination with a case having a motor therein for actuating the tool and a pressure fluid supply passage for the motor, of valve means in said passage in advance of its connection with the motor for controlling the flow of pressure fluid thereto, a governor device actuated by the motor in the rotation thereof in the actuation of the tool for automatically controlling the opening and closing of the valve as the speed of the motor varies, and means serving when the valve is closed to supply a limited amount of pressure fluid to the motor from the supply passage for maintaining the motor in operation when the governor closes the valve.

7. In a fluid actuated rotary tool, the combination with a case having a motor therein for actuating the tool and a pressure fluid supply passage for the motor, of a bushing dividing said passage in advance of its connection with the motor, said bushing having ports connecting the portions of the passage on opposite sides of the bushing, a valve in said bushing for closing said ports, a governor device actuated by the motor in the rotation thereof in the actuation of the tool for automatically controlling the opening and closing of the valve as the speed of the motor varies, and a passage in the valve connected with at least one of the ports in the bushing for supplying a limited amount of pressure fluid to the motor from the supply passage when the valve is closed to maintain the motor in operation when the governor closes the valve.

8. In a fluid actuated rotary motor, a rotor casing having a pressure fluid supply passage for the motor, a rotor in said casing, said rotor having radial slots extending lengthwise thereof and opening through the periphery and the ends of the rotor, blades slidably mounted in said slots and extending from end to end of the same, plates closing the ends of the casing, said plates having ports connecting the supply passage with the slots for feeding pressure fluid furnished the motor to the bottom of the slots through the ends of the same at the opposite ends of the rotor for holding the blades against the rotor chamber on the pressure side of the motor, said rotor having passages therein on the rear sides of the blades and connected with the bottoms of the slots for supplying pressure to the rotor casing for rotating the rotor, and exhaust ports in the casing for the rotor chamber.

In testimony whereof I affix my signature.

REINHOLD A. NORLING.